United States Patent
Lopez Alba

(12) 
(10) Patent No.: US 6,712,230 B2
(45) Date of Patent: Mar. 30, 2004

(54) PERFECTED DEVICE TO TRANSPORT VEHICLES IN ASSEMBLY LINES

(75) Inventor: Adelardo Lopez Alba, Sant Just Desvern (ES)

(73) Assignee: Transportes Continuos Interiores, S.A., Barcelona (ES)

( * ) Notice: Subject to any disclaimer, the term of this patent is extended or adjusted under 35 U.S.C. 154(b) by 0 days.

(21) Appl. No.: 09/986,097

(22) Filed: Nov. 7, 2001

(65) Prior Publication Data

US 2003/0085192 A1 May 8, 2003

(51) Int. Cl.⁷ ............................................... B66C 13/06
(52) U.S. Cl. ........................ 212/273; 212/319; 212/334; 414/626
(58) Field of Search ................................. 212/319, 273, 212/333, 334; 414/626, 917

(56) References Cited

U.S. PATENT DOCUMENTS

| | | | |
|---|---|---|---|
| 1,463,090 A | | 7/1923 | Nafziger |
| 2,933,198 A | | 4/1960 | Firestone et al. |
| 3,021,963 A | * | 2/1962 | Kasdorf et al. |
| 3,241,686 A | * | 3/1966 | Hurst .......................... 212/319 |
| 3,851,766 A | | 12/1974 | Gill et al. |
| 4,110,596 A | * | 8/1978 | Okamoto et al. ......... 219/124.4 |
| 4,245,548 A | * | 1/1981 | Blatt ........................... 92/5 R |
| 4,386,693 A | * | 6/1983 | Bachman ................... 198/409 |
| 4,724,944 A | * | 2/1988 | Koshigai et al. ............ 198/378 |
| 4,732,224 A | * | 3/1988 | Deeter et al. .................. 175/85 |
| 5,531,830 A | * | 7/1996 | Ichinose et al. ............. 118/423 |
| 5,941,678 A | * | 8/1999 | Saito .......................... 414/626 |

FOREIGN PATENT DOCUMENTS

| | | |
|---|---|---|
| DE | 4326563 A1 | 2/1995 |
| DE | G9416172.0 U1 | 2/1995 |
| EP | 644131 * | 9/1994 |
| SU | 220456 A | 10/1968 |
| SU | 1232631 A1 | 5/1986 |

OTHER PUBLICATIONS

Research Disclosure, "Vehicle Assembly Apparatus", No. 333, Emsworth, GB, pp. 56–58; Jan. 1992.

* cited by examiner

*Primary Examiner*—Thomas J. Brahan
(74) *Attorney, Agent, or Firm*—Michael J. Striker

(57) ABSTRACT

A device for transporting vehicles during manufacturing is disclosed that allows for upward and downward movement of the vehicle but avoids adverse longitudinal or transverse swinging. The inventive device includes a moving carriage mounted on a fixed rail, an upper frame, a lower frame moveably connected with an elevation mechanism and at least one first pair of articulated arms for stabilizing the vertical movement of the vehicle. An additional pair of articulated arms may be provided which extend and retract in a plane that is perpendicular to the first pair of articulated arms. Additional stabilizing roller elements connected to a fixed rail are provided on a lateral arm of the upper frame to prevent swinging of the upper and the lower frames of the transporting device.

5 Claims, 2 Drawing Sheets

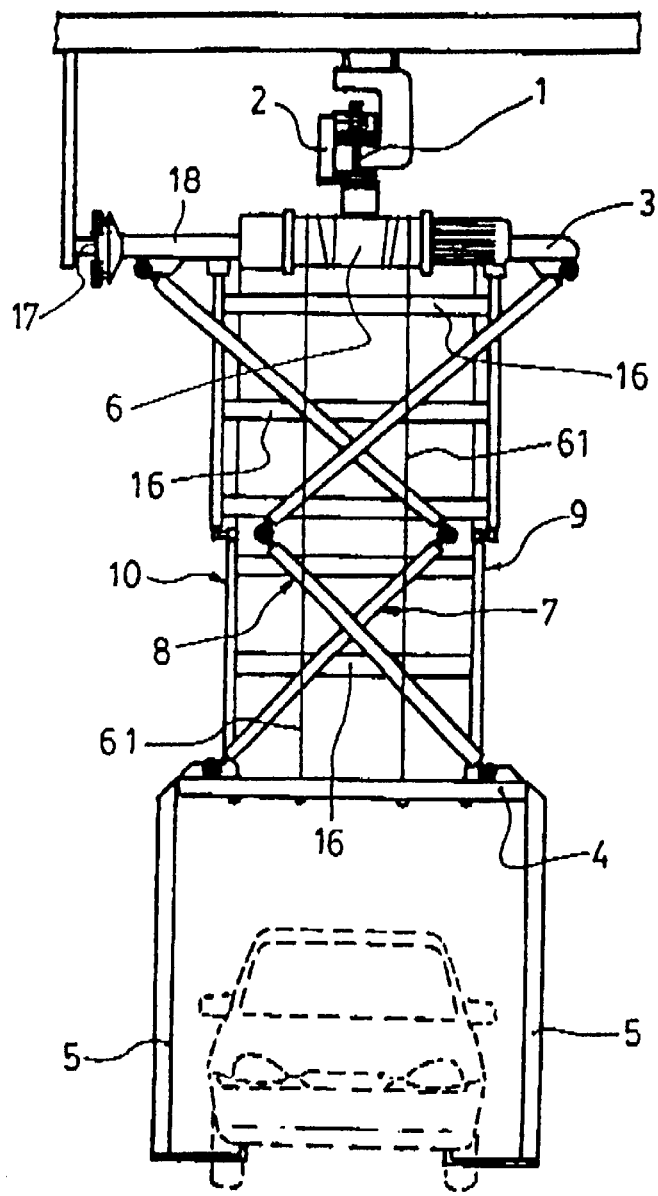
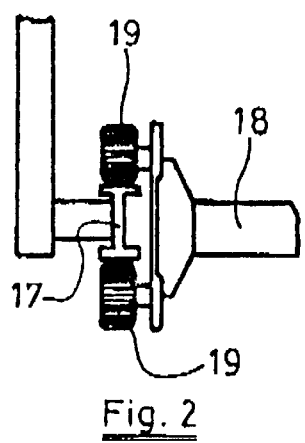
Fig. 1
Fig. 2

PERFECTED DEVICE TO TRANSPORT VEHICLES IN ASSEMBLY LINES

FIELD OF THE INVENTION

This invention relates to the field of assembly line production. More specifically, the invention relates to the efficient transport of automobiles in assembly line manufacturing operations.

BACKGROUND TO THE INVENTION

Assembly lines require vehicles to be transported, making them pass through a series of work stations in which different elements or components are added.

Depending on the elements to be added at each station, it may be convenient for the vehicle to have a more or less elevated height, which is achieved by means of a suitable transport device.

These transport devices have an elevated rail on which a carriage is mounted which moves longitudinally along the rail, transporting the vehicle in a longitudinal direction through the different work stations. From this carriage, a series of elements are suspended which enable the height of the vehicle to be varied with respect to the floor, which generally includes an upper frame fixed to the carriage, a lower frame provided with arms to hold the vehicle, an elevation mechanism which enables the height of the lower frame with respect to the upper frame, to be varied.

There are several means used to achieve the variable elevation of the vehicle; for example in patent DE 4326563, a vertically-positioned telescopic cylinder is used, which causes lateral stability problems as the vehicle is laterally pushed during the assembly of some of its components.

In patents SU 000220456 and DE 9416172 U, the upper and lower frames are connected by scissor mechanisms, the arms of which are articulated in the middle, thereby adopting a cross shape. In these patents, owing to the turn of the arms in the middle part, the ends of the scissors that are joined to the lower frame and to the upper frame must have a fixed turning point in one of the arms, and on the other arm, must have means to move with respect to the corresponding frame. Because of the shape of the scissor mechanism, when it is opened or closed, the arm ends move together or further apart.

The need for one of the scissor ends to move with respect to the upper and lower frames, means that the coupling between them must have a certain tolerance, which causes wear to the mobile parts and the possibility of the lower frame swinging with respect to the upper frame.

Another problem usually occurring in current transport devices used in assembly lines, is the transmission of lateral strength to the upper rail when the elevation unit of the vehicle swings sideways as a result of possible sideway movements of the vehicle.

OBJECTS AND SUMMARY OF THE INVENTION

This invention refers to a perfected device to transport vehicles in assembly lines, this device being of a type which includes: a lifted rail on which a moving carriage is assembled, an upper frame suspended from the carriage, a lower frame provided with arms to grip the vehicle, a cable elevation mechanism which enables the height of the lower frame with respect to the upper frame, to be varied, and means to stop the lower frame from swinging with respect to the upper frame during assembly.

The device of this invention provides a series of building details with the object of preventing the lower frame from swinging with respect to the upper frame, both in the longitudinal and the transverse directions, and means to stop the elevation unit of the vehicle from balancing with respect to the elevated rail.

The means employed in this device to stop the elevation unit of the vehicle from balancing with respect to the elevated rail, comprises a fixed rail placed parallel to the elevated rail and to one side of the upper frame and includes a side arm joined to the upper frame and provided with support means on the aforementioned fixed rail. The fixed support rail can extend throughout the length of the line, or be placed only in the working areas, as it is precisely in these areas where new components are assembled on the vehicle and, therefore, where it can be pushed sideways.

The support means of the lateral arm, joined to the upper frame, consist of roller elements, which act on the upper and lower sides of the fixed rail, thereby preventing the upper frame from swinging sideways, and therefore, the whole elevation unit of the vehicle with respect to the elevated rail.

The means used to prevent the lower frame from swinging with respect to the upper frame, both in the longitudinal and the transverse directions, consists of four articulated arms, the ends of which are fixed to the frames with horizontal rotation axles.

Each articulated arm consists of an upper bar and a lower bar joined at the opposite ends by means of a horizontal rotation axle. These articulated arms adopt a "V" or arm shape and not a double scissor shape as those used in the patents mentioned herein above.

The use of articulated arms provides a series of advantages with respect to the scissor mechanisms, as each is connected to the upper frame and to the lower frame by a single rotation point, which enables greater adjustment in assembly than with the scissors provided by a fixed rotation point and a moving support point.

Two of the four articulated arms which connect the upper to the lower frame, have vertical, parallel planes near to each other, with one of them fixed to one of the sides of the upper frame and the lower frame, and the other to the opposite side of these frames, so that the angles or vertexes defined by these articulated arms are oriented in opposite directions, thereby preventing the lower frame from swinging sideways with respect to the upper frame.

The other two articulated arms are positioned in two parallel, vertical planes, coinciding with the sides of the upper and lower frame, and perpendicular to the two articulated arms mentioned previously.

These two articulated arms are joined by horizontal crossbeams to make them more rigid and ensure that they are parallel, which, together with the two articulated arms mentioned initially, prevents the lower frame from swinging with respect to the upper frame.

BRIEF DESCRIPTION OF THE DRAWINGS

FIG. 1 shows a front view of an embodiment of the perfected device for the transport of vehicles.

FIG. 2 shows details in larger scale of the side arm support of the upper frame on the fixed rail.

DETAILED DESCRIPTION OF A PREFERRED EMBODIMENT

Figure 3:
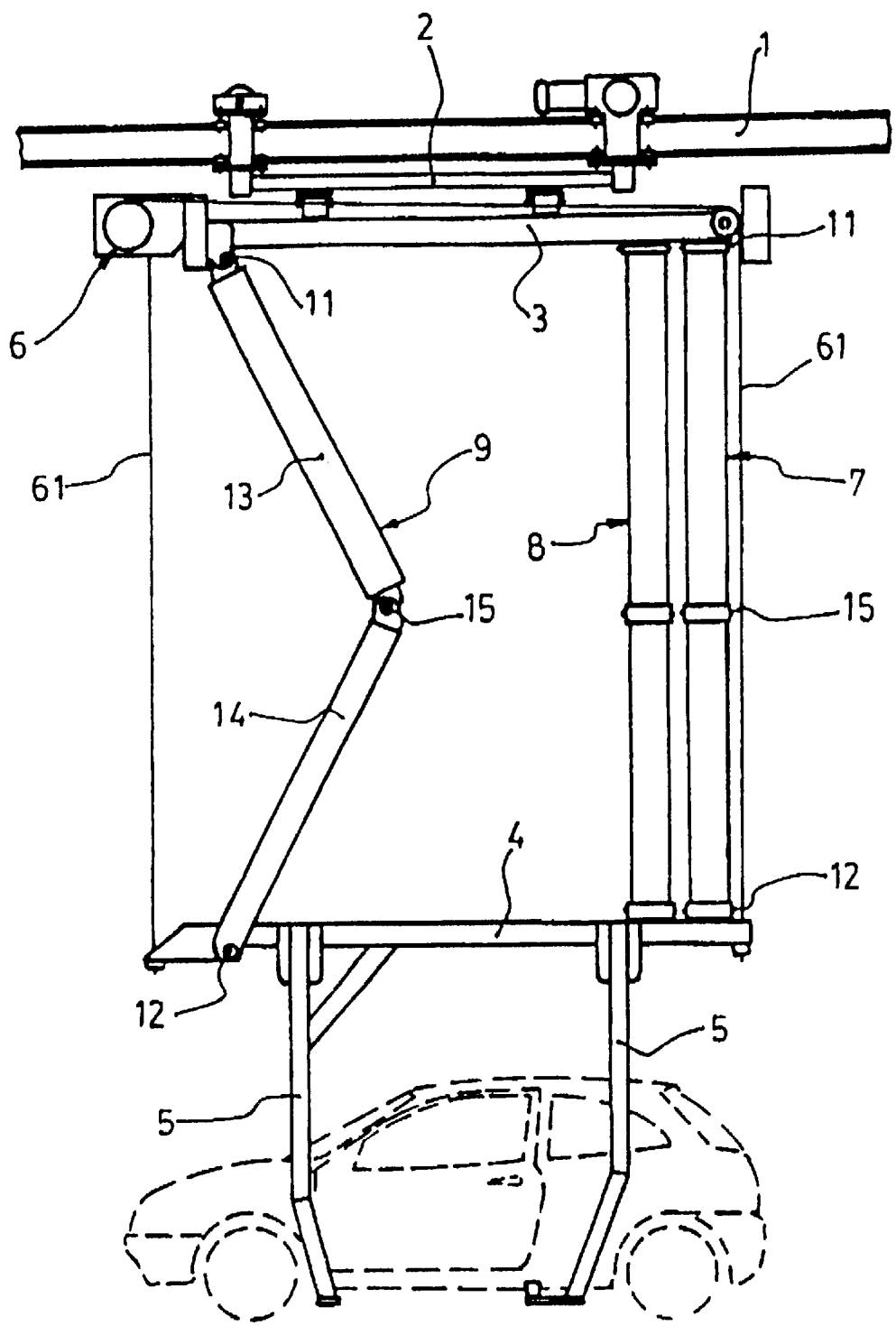
FIG. 3 shows a side view of an embodiment of the perfected device for the transport of vehicles.

A preferred embodiment of this invention has an elevated rail (1) on which a moving carriage (2) is mounted, an upper frame (3) fixed to the carriage (2), a lower frame (4) provided with arms (5) to grip the vehicle to be transported, and an elevation mechanism (6) which enables the height of the lower frame (4) to be varied with respect to the upper frame (3), thereby lifting or lowering the vehicle to be transported.

The lower frame (4) is suspended from cables (61) corresponding to the elevation mechanism (6) fixed to the upper frame (3). The upper frame (3) and the lower frame (4) are connected by four articulated arms (7, 8, 9 and 10) fixed by their ends to the upper frame (3) and to the lower frame (4) by means of horizontal rotation axles (11 and 12).

Each articulated arm (7, 8, 9 and 10) includes of an upper bar (13) and a lower bar (14) connected at their opposite ends with a horizontal rotation axle (15).

The articulated arms (7 and 8) have two parallel, vertical planes, near to each other, and are joined to the opposite sides of the upper frame and the lower frame, as indicated in FIG. 1.

The articulated arms (9 and 10) have two vertical planes in parallel, corresponding to the opposite sides of the upper frame (3) and the lower frame (4) and perpendicular to those defined by the articulated arms (7 and 8).

The articulated arms (9 and 10) are connected by cross-beams (16) to make them rigid and to ensure that they remain parallel.

The purpose of the articulated arms (7, 8, 9 and 10) is to prevent the lower frame (4) from swinging with respect to the upper frame (3), both in the longitudinal and the transverse directions.

To prevent the elevation unit formed by the upper frame (3), the lower frame (4) and the four articulated arms (7, 8, 9 and 10) from swinging with respect to the elevated rail (1), this device includes a fixed rail (17) which is parallel to the elevated rail (1) and to one of the sides of the upper frame (3), and a lateral arm (18) joined to the upper frame (3) and provided with means of support on the fixed rail (17).

These means of support consist of roller elements (19) which are placed on the upper and lower sides of the fixed rail (17), which prevent the upper frame (3) from swinging sideways with respect to the elevated rail (1) and the lateral arm (18), thereby acting as a stabilizer or anti-swing element.

It should be understood that the embodiment of this invention is illustrative of the principals only and is not intended to limit the scope to the particular embodiment described. It is conceivable that others who are skilled in the art can define other implementations of the present invention as claimed herein below according to the principals of the present invention.

What is claimed is:

1. A device for transporting vehicles, comprising an elevated rail on which a moving carriage is mounted; an upper frame supporting said carriage; a lower frame provided with means for gripping a vehicle; an elevation mechanism for lifting said lower frame with respect to said upper frame; means for preventing said lower frame from swinging with respect to said upper frame, said preventing means including four articulated arms articulately connected with said upper frame and said lower frame by horizontal rotation axles, said articulated arms including two first articulated arms extending in vertical parallel planes near one another and having one of said first articulated arms fixed to one side of said upper frame and to one side of said lower frame and the other of said first articulated arms having one end fixed to an opposite side of said upper frame and to an opposite side of said lower frame, said articulated arms having two second articulated arms which extend in vertical parallel planes coinciding with opposite sides of said frames and extending perpendicular to said planes in which said first articulated arms extend, said elevation mechanism including four cables suspending said lower frame on said upper frame separately and independently from said articulated arms.

2. A device as defined in claim 1; and further comprising a single fixed rail having upper and lower sides, placed parallel to said elevated rail and to one side of said upper frame; a lateral arm joined to said upper frame and provided with means for supporting on said fixed rail.

3. A device as defined in claim 1, wherein each of said articulated arms includes an upper bar and a lower bar connected with one another by a horizontal rotation axle, said articulated arms being formed so that they become V-shaped when retracted.

4. A device as defined in claim 1, wherein at least said articulated arms of said second pair of arms are joined by horizontal cross-beams so as to ensure that said articulated arms of said at least second pair of arms remain parallel.

5. A device as defined in claim 1, wherein said four cables include two cables extending substantially in one plane and two cables extending substantially in another plane which is spaced from said one plane.

* * * * *